United States Patent Office 3,775,510
Patented Nov. 27, 1973

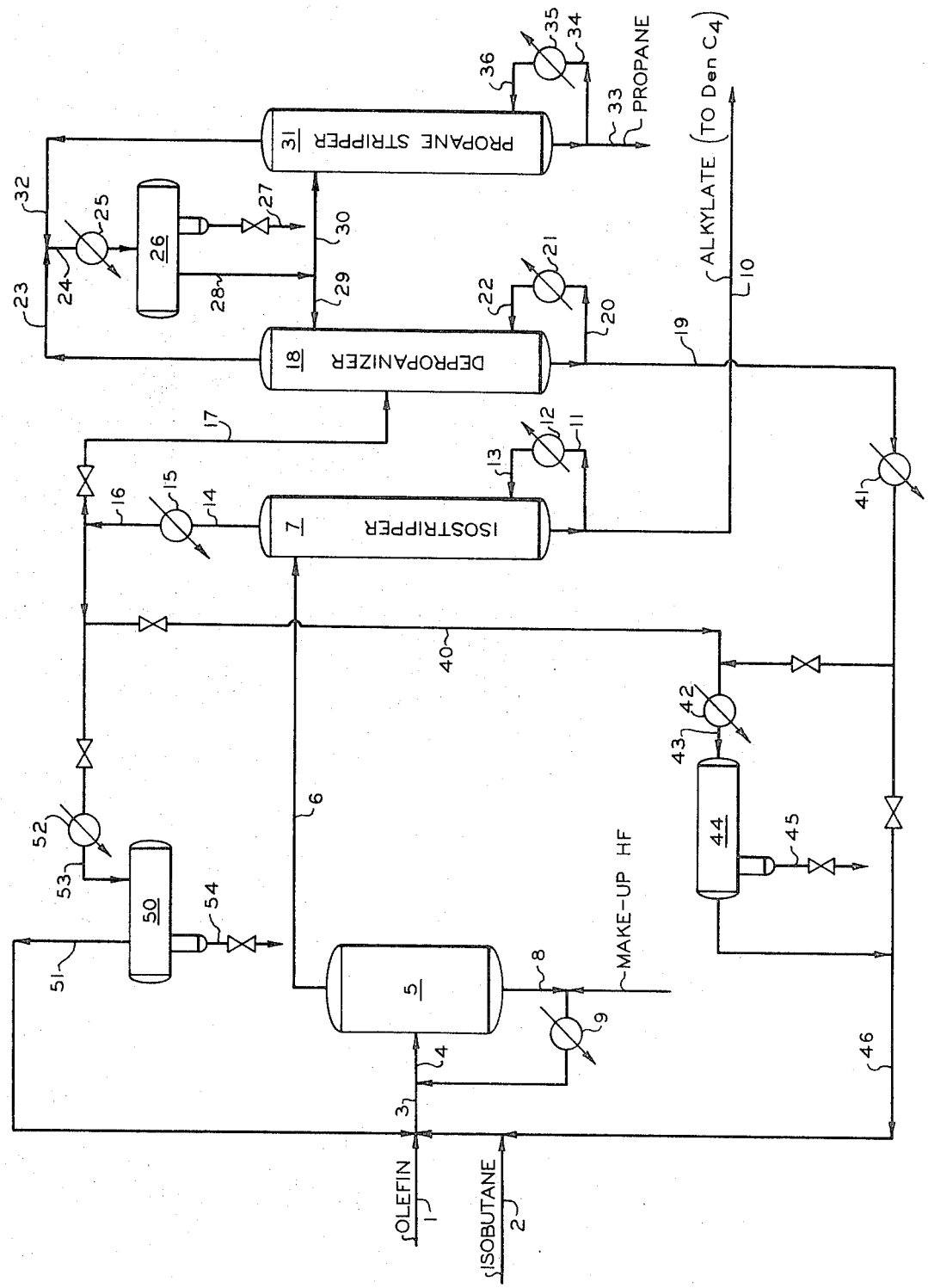

3,775,510
REFRIGERATING COOLED RECYCLED ISOBUTANE IN ALKYLATION
Tom Hutson, Jr., and Cecil O. Carter, Bartlesville, Okla., assignors to Phillips Petroleum Company
Filed Aug. 6, 1970, Ser. No. 61,665
Int. Cl. C07c *3/54*
U.S. Cl. 260—683.41
4 Claims

ABSTRACT OF THE DISCLOSURE

At least a portion of recycle isoparaffin, e.g., isobutane is treated in an alkylation operation, e.g., isoparaffin-olefin alkylation to remove substantially the hydrogen fluoride therefrom and is then returned to the alkylation operation. In one embodiment hydrocarbon phase from HF settler is charged to a fractionation from which alkylate is removed as bottom, an overhead is split into at least two streams, a stream containing some propane to avoid propane buildup and another stream from which HF is removed as by refrigeration whereupon the latter stream containing a substantially reduced HF is recycled to alkylation.

---

This invention relates to alkylation. It also relates to hydrofluoric acid catalyzed alkylation. Further, it relates to the alkylation of an isoparaffin with an olefin.

In one of its concepts, the invention provides an isoparaffin-olefin alkylation operation in which an isoparaffin, e.g., isobutane is alkylated with an olefin, e.g., butylene in the presence of hydrofluoric acid and wherein at least a portion of the isoparaffin recycled stream to the alkylation reaction zone is treated to remove therefrom a substantial quantity of unavoidably contained, substantially dissolved, hydrogen fluoride. In another of its concepts, the invention provides an operation as described wherein a hydrocarbon phase is passed from the alkylation zone to a fractionation operation, e.g., an isostripper from which an alkylate is removed as bottoms and from which as overhead there is removed a recycled isopraffin stream, a portion of which is treated to remove propane from the system and at least another portion of which is treated as herein described to remove HF therefrom prior to its being recycled to the alkylation reaction zone. In a further concept of the invention, the HF is removed from that portion of the recycled isoparaffin stream which is treated to remove HF therefrom by chilling the said stream and removing therefrom liquid HF as a bottoms in a phase separation zone whereupon the treated isoparaffin is recycled to the alkylation reaction zone.

It has been found that recycling a low HF-content isobutane stream, containing below about 0.4 weight percent HF, to an alkylation reaction in which isobutane is alkylated to produce an alkylate stock suitable for a blending with motor fuel constituents to produce a high octane motor fuel results in an increase in the octane of the HF alkylate obtained from such an operation. Broadly, the invention lies in the discovery that HF shall be removed from the recycle isoparaffin stream prior to admixing it with the olefin feed stream; that is, that the HF shall be substantially reduced to below that value which has normally heretofore been return to the alkylation reaction. Although, priorly, the recycle stream here discussed has been chilled, no attempt has been made to separate any HF phase which may have been formed. For example, it has been found that reducing the weight percent of HF in the recycled isobutane from about 0.58 to approximately 0, under comparable conditions, a better quality alkylate is obtained and the research octane number, clear, is increased from 92.3 to 94.1 while the research octane number plus 3 CC's of tetraethyl lead is increased from 103.5 to 105.6. In view of the present emphasis on lead-free fuels, the research octane number, clear (that is without lead) increase which can be obtained from 92.3 to 94.1 is important. Also, with a relatively small amount of TEL added, the alkylate of the invention will, because of its higher clear octane number, yield the ultimate desired high octane value. The cost of producing lead-free fuels, as evidenced by prices in recent trial markets, it would appear will be considerably higher per octane number than it has been with the use of tetraethyl lead. Accordingly, any improvement in the research octane number, clear, which can be obtained in the plant as in an alkylation operation as herein described is important.

It is an object of this invention to provide an alkylation operation. It is a further object of this invention to provide an alkylation operation from which an increased octane number alkylate can be obtained. Still further, it is an object of this invention to provide for a better quality of feeds to an alkylation reaction zone so that the alkylation therein accomplished is accomplished under conditions such that an improved octane number of the alkylate product can be, and is, obtained.

Other aspects, concepts, objects, and the several advantages of the invention are apparent from a study of this disclosure, the drawing, and the appended claims.

According to the present invention, in order to increase the octane of HF alkylate, the recycled isoparaffin, e.g., isobutane is processed to minimize the amount of HF recycled therewith to alkylation.

Generally, the HF recycled in the isoparaffin will be reduced to below about 0.4 weight percent, as stated; preferably it will be reduced to about 0.28–0.3 weight percent.

Further, according to the invention, in one embodiment thereof, the hydrocarbon phase from the HF settler is charged to an isostripper, an alkylate fraction is removed from the isostripper as bottoms, an overhead is condensed at conventional temperatures, the overhead liquid product is split into at least one stream sufficient to be processed to prevent propane buildup, which is passed to a propane removal zone and at least one other stream which is processed to remove therefrom HF as by in the embodiment being described refrigeration so that a low HF-content isoparaffin or isobutane stream is recycled to the alkylation zone.

In a commercial alkylation unit in which isobutane is recycled from an isostripper and is condensed with cooling water the normal temperature of the recycled isobutane will be on the order of about 100° F. At this temperature the saturation concentration of HF acid will be about 0.6 weight percent. According to the invention, the isobutane is chilled to a temperature of the order of about 50° F. The saturation concentration of the HF acid is thus reduced to near 0.28 weight percent. By proceeding as herein described, the following results can be obtained as follows:

| | 1 | 2 |
|---|---|---|
| Conditions: | | |
| HF in IC₄, wt. percent | 0.58 | 0 |
| Reactor temp., F | 70 | 70 |
| Reactor residence time, sec | 29.1 | 35 |
| Hydrocarbon dispersion, percent | 5.1 | 6.2 |
| Alkylate quality: | | |
| ASTM dist. EP, F | 404 | 358 |
| Ron, clear | 92.3 | 94.1 |
| Ron +3 | 103.5 | 105.6 |

The following is a typical example of the operation of the invention wherein refrigerated heat exchange is used in addition to the conventional heat exchange that is used in commercial alkylation operations.

Typical Operation—Streams

| | |
|---|---:|
| Olefin feed (1): | |
|   Barrels/day | 4773 |
|   Composition, wt. percent: | |
|     Propylene | 20.8 |
|     Butylenes | 37.7 |
|     $C_3$ and $C_4$ Paraffins | 41.5 |
| Isobutane feed (2): | |
|   Barrels/day | 2851 |
|   Composition, wt. percent: | |
|     Propane | 0.7 |
|     Isobutane | 95.3 |
|     Normal butane | 4.0 |
| Recycle isobutane (51 and 46): | |
|   Barrels/day | 39342 |
|   Composition, wt. percent: | |
|     Propane | 4.6 |
|     Isobutane | 87.7 |
|     Normal butane | 7.7 |
|   Wt. percent HF in recycle | 0.17 |
| HF catalyst circulation (8): | |
|   Barrels/day | 187784 |
|   Temperature, °F. | 70 |
|   Wt. percent HF | 90 |
| Alkylate product (10) (after normal butane removal): | |
|   Barrels/day | 5000 |
|   Ron, clear | *93.6 |
| Reaction zone (4): | |
|   Temperature, °F. | 70 |
|   Pressure, p.s.i.g. | 175 |
| Isostripper (7): | |
|   Pressure, p.s.i.g. | 115 |
|   Top temp., °F. | 140 |
|   Bottom temp., °F. | 275 |
| Stream (16): | |
|   Barrels/day | 23605 |
|   Temperature, °F. | 100 |
|   Wt. percent HF | 0.6 |
| Stream (51): | |
|   Temperature, °F. | 50 |
|   Wt. percent HF | 0.28 |
| Stream (19)—after cooler: | |
|   Barrels/day | 15737 |
|   Temperature, °F. | 100 |
|   Wt. percent HF | 0 |

*Research octane number, using no tetraethyl lead.

When operating conventionally using the above conditions (without refrigeration and HF removal from recycle isobutane of the invention), a typical octane number of the debutanized alkylate (Ron, clear) is 93.0. The invention, in the above operation, gains 0.6 octane number.

Referring now to the drawing, olefin feed is passed by 1 together with isobutane makeup feed by 2, by 3, and into reaction conduit 4 and then to phase separator 5. Alkylation with hydrofluoric acid catalyst under alkylation conditions is effected in conduit reactor 4. Hydrocarbon subjected to alkylation forms an upper phase, which is passed by 6 to isostripper 7 and a HF acid containing phase, which is passed by 8 cooler 9 back to reactor 4. In lieu of a single reactor conduit, it will be understood that there can be an agitated reaction zone, or section, and a separate settler zone, section, or vessel. A bottoms is taken from isostripper 7 by 10 and, after removal of normal butane and usual chemical or other treatment, is suitable for use as blending stock in the production of motor fuels. For column reboil purposes, the bottom of column 7 is heated by recycling a portion of bottoms product by 11, heater 12, and 13 from 10 to the tower bottom. The overhead from column 7 passes by 14 through cooler condenser 15, and is now split into stream 16 and stream 17, the latter being passed to depropanizer 18 (to prevent propane buildup in the system), and from which isobutane is removed as bottoms 19 and is cooled in 41. A portion of bottoms 19 is recycled by 20, heater 21 and 22 to the depropanizer to reboil the bottoms. The depropanizer overhead is passed by 23 and 24 into cooler condenser 25 and, thence, into accumulator 26, from which a liquid HF phase is withdrawn at 27. A hydrocarbon phase is taken from drum 26 by 28 and 29 and used as reflux for the top of tower 18. Another portion is passed by 30 into propane stripper 31, from which an overhead containing HF is passed by 32 and 24, and cooler condenser 25 to drum 26. Propane bottoms are removed from the system at 33. The tower bottom is reboiled by heating a portion taken from stream 33, by 34 through heater 35 and 36 back to tower bottom.

Returning now to stream 16 and to stream 19, according to the invention, these streams are sufficiently cooled, or chilled, to remove therefrom a substantial portion, if not all, of the HF ordinarily contained in said streams. Thus, at least a portion of stream 16 is passed by 40 through chiller 42, together with at least a portion of stream 19 in this embodiment. The chilled streams are passed by 43 to phase separator 44, from which a HF phase is removed by 45. The isobutane, from which HF has now been considerably removed, if not entirely eliminated, is passed by 46, 3, to reactor 4, together with recycled isobutane coming from isostripper overhead accumulator 50, by 51 to alkylation reactor 4.

It will be noted that in this embodiment, stream 16 passes through chiller 52 and is passed by 53 into accumulator 50, from which also a HF phase is removed at 54. Thus, in the embodiment being described, HF is removed from the recycled streams at both 45 and at 54, thus to ensure that olefin is thoroughly admixed into the paraffin, containing substantially no HF, prior to the admixture being contacted with the HF catalyst, fully and intimately in a very short space of time. It is to this type of contacting, which is a concept basic to this invention, that the improvement in octane number is now attributed.

Coolers 9, 15, 25, and 41 are conventional indirect heat exchangers employing water as the coolant, product leaving such exchangers at about 100° F., in the conventional operation.

Exchangers 42 and 52 are conventional refrigerated indirect heat exchangers, using refrigerant, e.g. propane, to attain the desired lower temperatures that cannot be attained by conventional cooling water.

It will be understood by one skilled in the art in possession of this disclosure, having studied the same, that while the removal of the soluble HF, as herein described, has been accomplished by refrigeration that any equivalent method for this removal can be practiced. This HF can be removed chemically, as by neutralization, or by water wash, or by any other suitable method, such as contacting with clays known to be particularly effective in removing hydrofluoride from organic streams. It is now preferred, for reasons obvious to those skilled in the art, to remove the HF by chilling, as herein described.

Isoparaffins employed can include isobutane, isopentane, and isohexanes, either alone or in admixtures. Olefins can include propylene, butylenes, and amylenes, either alone or in admixture, as is known in the alkylation art.

Some plants charge propylene-butylene olefin mixtures, and some plants segregate the propylene and butylene feeds.

The invention can be beneficially applied to the feeds mentioned and to similar feeds.

Reference is made to page 266 of "Hydrofluoric Acid Alkylation," by Phillips Petroleum Company, Bartlesville, Okla., copyright 1946, which relates the solubility of HF in isobutane versus temperature.

The hydrofluoric acid catalyst can be substantially anhydrous or can contain water in small amounts, as is known in the alkylation art.

Reasonable variation and modification are possible within the scope of the foregoing disclosure and the appended claims, the essence of which is that HF acid shall be removed from the recycled isoparaffin stream in an isoparaffin olefin alkylation so that the isoparaffin can receive for admixture therewith intimately the olefin prior to contact of the admixture with the HF catalyst in one embodiment now preferred the HF being removed from the recycled isoparaffin stream by chilling the same well below the temperature at which it has been ordinarily recycled and separating therefrom a HF phase.

What is claimed is:

1. In an isobutane-olefin alkylation wherein isobutane is alkylated with olefin in the presence of HF catalyst, and wherein a stream consisting essentially of high-purity isobutane and dissolved HF therein is recovered from an alkylation hydrocarbon effluent and recyced to the alkylation, the improvement which comprises reducing HF in said high-purity isobutane to a value below about 0.3 weight percent by refrigerating said high-purity isobutane to chill the same in the absence of any substantial amount of hydrocarbon heavier than isobutane and wherein the recycle high-purity isobutane is refrigerated sufficiently to a temperature of about 50° F. to separate therefrom an appreciable HF phase and to reduce HF remaining in said isobutane to a value below about 0.3 weight percent, said HF phase is separated from said isobutane and said isobutane is then recycled to said alkylation.

2. In a process wherein isobutane is alkylated with an olefin in an alkylation zone, the alkylated reaction mass is settled forming an HF acid phase and a hydrocarbon phase, said acid phase is separated and recycled to the alkylation zone, the hydrocarbon phase is passed to a fractionation zone wherein isobutane together with residual HF acid is taken overhead as a vapor, cooled and condensed, and wherein a bottoms liquid is withdrawn as product of said process, the improvement comprising refrigerating said cooled and condensed overhead sufficiently to form an isobutane phase and an HF phase to reduce the HF in said isobutane phase to a value less than about 0.3 weight percent, removing said HF phase and recycling said isobutane phase to said alkylation zone.

3. An operation according to claim 2 wherein the olefin is butylene, and the temperature to which at least a portion of the recycled isobutane stream is chilled is at least of the order of about 50° F.

4. An operation according to claim 2 wherein at least a portion of said overhead is passed to a depropanizing zone, wherein propane is separated from the operation and from which a recycled isobutane stream is obtained, said stream is chilled to remove an appreciable amount of liquid HF therefrom and said isobutane is then recycled to the alkylation zone.

References Cited

UNITED STATES PATENTS

| | | | |
|---|---|---|---|
| 3,346,660 | 10/1967 | Hutson, Jr. et al. | 260—683.49 |
| 3,478,125 | 11/1969 | Chapman | 260—683.48 |

DELBERT E. GANTZ, Primary Examiner

G. J. CRASANAKIS, Assistant Examiner

U.S. Cl. X.R.

260—683.48